US008024764B2

(12) United States Patent
Walter et al.

(10) Patent No.: US 8,024,764 B2
(45) Date of Patent: Sep. 20, 2011

(54) METHOD AND APPARATUS FOR PROCESSING MULTIMEDIA SIGNALS

(75) Inventors: Edward Walter, Boerne, TX (US); Larry B. Pearson, San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 771 days.

(21) Appl. No.: 11/688,585

(22) Filed: Mar. 20, 2007

(65) Prior Publication Data

US 2008/0235743 A1 Sep. 25, 2008

(51) Int. Cl.
*H04N 7/173* (2011.01)
*H04N 7/16* (2011.01)
*H04M 7/00* (2006.01)
*H04J 1/02* (2006.01)
*H04J 99/00* (2009.01)

(52) U.S. Cl. ........ 725/106; 725/111; 725/133; 725/141; 725/153; 379/221.11; 379/457; 370/493; 370/546

(58) Field of Classification Search .......... 725/106, 725/111, 133, 141, 153; 379/221.11, 457; 370/493, 546
See application file for complete search history.

(56) References Cited

U.S. PATENT DOCUMENTS

| | | | |
|---|---|---|---|
| 5,422,936 A * | 6/1995 | Atwell | 379/88.23 |
| 6,130,726 A * | 10/2000 | Darbee et al. | 348/734 |
| 6,305,016 B1 * | 10/2001 | Marshall et al. | 725/41 |
| 6,424,627 B1 * | 7/2002 | Sørhaug et al. | 370/241 |
| 6,614,887 B1 * | 9/2003 | Satapathy et al. | 379/88.22 |
| 7,006,611 B2 * | 2/2006 | Bonn et al. | 379/93.31 |
| 7,212,837 B1 * | 5/2007 | Calhoun et al. | 455/560 |
| 7,359,369 B2 * | 4/2008 | Boynton et al. | 370/352 |
| 7,493,079 B2 * | 2/2009 | Koizume et al. | 455/3.06 |
| 7,515,698 B2 * | 4/2009 | Van Wyk et al. | 379/142.16 |
| 2002/0138851 A1 * | 9/2002 | Lord et al. | 725/133 |
| 2003/0095211 A1 * | 5/2003 | Nakajima | 348/734 |
| 2003/0220881 A1 * | 11/2003 | Pirhonen et al. | 705/53 |
| 2004/0117831 A1 * | 6/2004 | Ellis et al. | 725/53 |

(Continued)

FOREIGN PATENT DOCUMENTS

WO 0247383 6/2002

OTHER PUBLICATIONS

Softpedia, "Cell Phone Television Provided by O2 and NTL Broadcast", Softpedia News: Communications; 5 pages article. Website last visited Mar. 20, 2007. http://news.softpedia.com/news/Cell-phone-television-provided-by-O2-and-NTL-Broadcast-1878.shtml.

*Primary Examiner* — Hoang-Vu A Nguyen Ba
(74) *Attorney, Agent, or Firm* — Andrew Gust; Guntin Meles & Gust, PLC

(57) ABSTRACT

A method and apparatus for processing multimedia signals is disclosed. A system that incorporates teachings of the present disclosure may include, for example, an adjunct device coupled between a Set-Top Box (STB) and a media device. The adjunct device can have a controller element that receives a telephony signal from a communication system and an Internet Protocol Television (IPTV) multimedia signal supplied by the STB, monitors call origination activities in the telephony signal, and presents at the media device in whole or in part the telephony and the IPTV multimedia signal according to the call origination activities monitored. Additional embodiments are disclosed.

24 Claims, 7 Drawing Sheets

U.S. PATENT DOCUMENTS

| | | |
|---|---|---|
| 2004/0136505 A1* | 7/2004 | Garg et al. ............... 379/88.12 |
| 2004/0259537 A1* | 12/2004 | Ackley ..................... 455/420 |
| 2005/0160155 A1* | 7/2005 | Geekee et al. ............. 709/220 |
| 2005/0212687 A1* | 9/2005 | Nishikata ............... 340/825.72 |
| 2005/0278436 A1* | 12/2005 | Sharma et al. ............. 709/223 |
| 2007/0074245 A1* | 3/2007 | Nyako et al. ............... 725/34 |
| 2007/0250884 A1* | 10/2007 | Qiu et al. ................. 725/106 |
| 2007/0274486 A1* | 11/2007 | Kister ................... 379/142.06 |

* cited by examiner

200

300

METHOD AND APPARATUS FOR PROCESSING MULTIMEDIA SIGNALS

FIELD OF THE DISCLOSURE

The present disclosure relates generally to media services and more specifically to a method and apparatus for processing multimedia signals.

BACKGROUND

Recent advances in media services allow various types of media to be efficiently distributed to consumers at home or commercial enterprises. Media services can include audio and/or visual services supplied by cable, satellite, and/or IP-based television (IPTV) broadcast companies.

A broadcast service provider generally provides a set top box that connects to a television. The set top box provides the consumer a selection of channels from which to view and/or listen to an assortment of media programs. Although media services have proven to be commercially viable and useful, some consumers are generally interested in receiving more comprehensive services which are not readily offered by the broadcast service providers.

A need therefore arises for a method and apparatus for processing multimedia signals.

DETAILED DESCRIPTION

Figure 1:
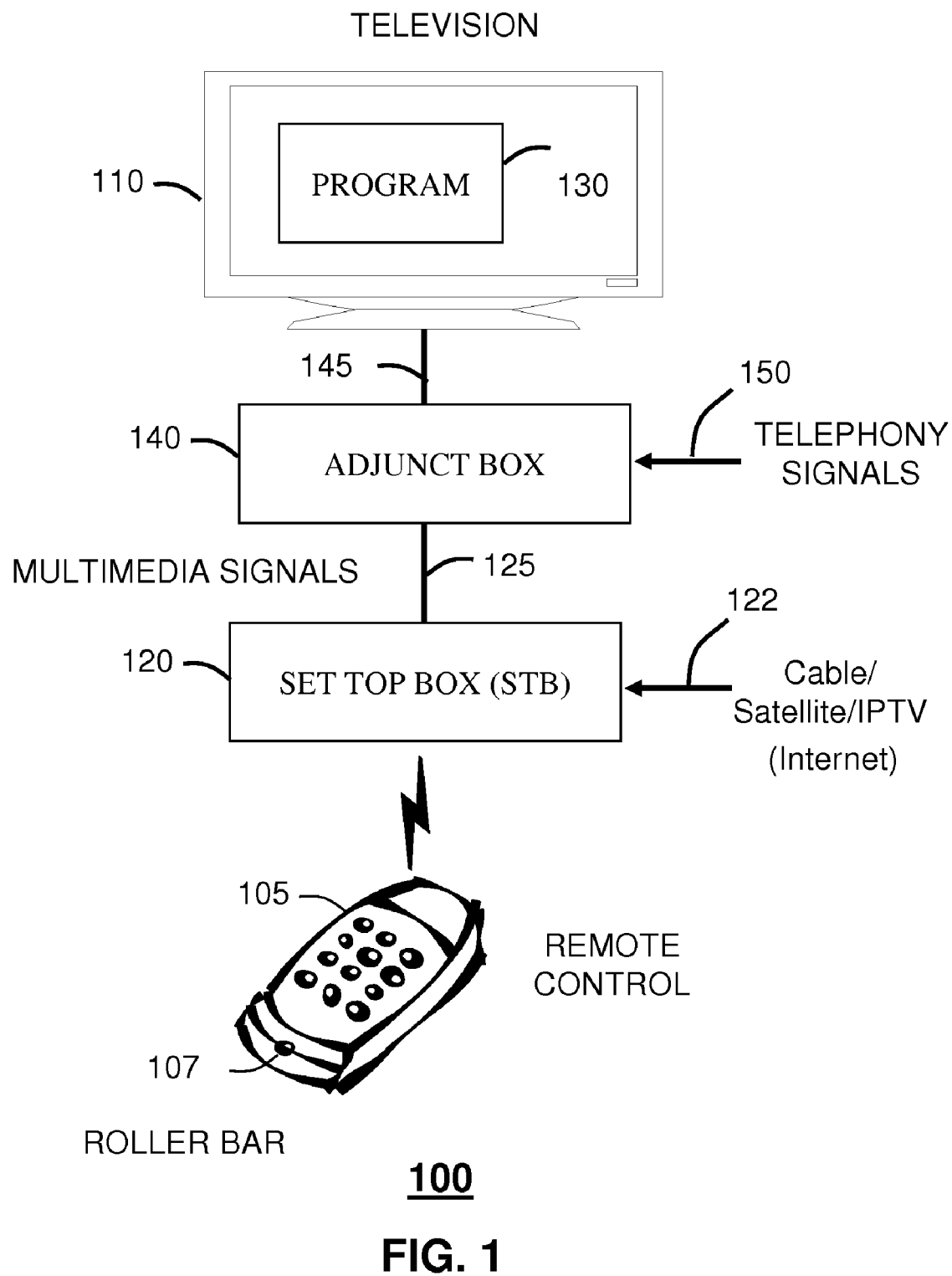
FIG. 1 depicts an exemplary embodiment of a media system.

Embodiments in accordance with the present disclosure provide a method and apparatus for processing multimedia signals.

In a first embodiment of the present disclosure, an adjunct device coupled between a Set-Top Box (STB) and a media device. The adjunct device can have a controller element that receives a telephony signal from a communication system and an Internet Protocol Television (IPTV) multimedia signal supplied by the STB, monitors call origination activities in the telephony signal, and presents at the media device in whole or in part the telephony and the IPTV multimedia signal according to the call origination activities monitored.

In one arrangement, the controller element can detect call origination activity in the telephony signal, generate a multiplexed signal comprising at least a portion of the telephony signal and the multimedia signal, and present the multiplexed signal at the media device. The multiplexed signal can correspond to an overlay of images corresponding to a graphical user interface (GUI) associated with the telephony signal and a media program associated with the multimedia signal.

In another arrangement, the controller element can interrupt a presentation at the media device of a media program associated with the multimedia signal, record a departure mark corresponding to the interruption of the media program, record the media program from the departure point, and present a GUI associated with the telephony signal at the media device.

In a second embodiment of the present disclosure, a computer-readable storage medium can have computer instructions for presenting at a media device in whole or in part telephony signals and multimedia signals supplied by an Internet Protocol Television (IPTV) subsystem. In one arrangement, the computer-readable storage medium can be an adjunct device associated with a TV set that receives telephony inputs and internet protocol inputs. The adjunct device can determine if a call originates during a presentation of media, and present at the media device an overlay of images corresponding to a GUI associated with the telephony signal and a media program associated with the multimedia signal in response to the detected call origination activity.

In a third embodiment of the present disclosure, a method for delivering media services is provided. The method can involve presenting at a media device 110 by way of an adjunct device coupled to a video signal supplied by an STB and a telephony signal supplied by a communication system a combined signal comprising in whole or in part the telephony signal and the video signal. The method can include presenting at the media device 110 at least one among a GUI associated with the telephony signal in place of a media program supplied by the video signal when the adjunct device detects call origination activity in the telephony signal, the media program in place of the GUI when the adjunct device detects no call origination activity in the telephony signal, or an overlay of the GUI and the media program when the adjunct device detects call origination activity in the telephony signal.

Referring to FIG. 1, an exemplary embodiment of the media system 100 is shown. The media system 100 can operate with cable, satellite or IPTV signals. For illustration purposes only, the media system 100 in the present disclosure is assumed to operate with IPTV services, and thereby shall be referred to as IPTV system 100. Accordingly, the IPTV system 100 can include a media device 110 for presenting one or more programs 130, an adjunct device 140 operatively coupled to the media device 110, and a set-top box (STB) 120 operatively coupled to the adjunct device 140. The media device 110 can represent at least one among a television unit, and an audio unit, but is not limited to these. The adjunct device 140 can receive telephony signals 150 from a circuit-switched (e.g., PSTN) or packet-switched (e.g., VOIP) communication provider and multiplex the telephony signals with multimedia signals 125 provided by the STB 120. A controller element of the adjunct device 140 can process said signals and present at the media device 110 in whole or in part the telephony signals 150 and multimedia signals 125.

The IPTV system 100 is not limited to the arrangement shown and other embodiments are herein contemplated. As one example, the adjunct device 140 can be embedded within the media device 110 or within the STB 120. As a separate unit, as shown, the adjunct device 140 allows for integration with any set top box, whether it be satellite, cable, or IPTV. The adjunct device 140 is also capable of delivering specific Internet Protocol (IP) based features, such as, address books, yellow page searching, event notifications, or other common IP-based services that can be presented at the media device 110.

The STB 120 can be a standard device provided by a broadcast communications provider such as a cable, a satellite, or IPTV service provider. The STB 120 can receive a signal 122, such as a cable signal or through a coaxial cable, a BNC, or any other suitable connector to generate a multimedia signal 125 to deliver a presentation of a media program 130 at the media device 110. The multimedia signal 125 can comprise at least one among digital and analog signals, each transporting at least one among image, audio data, or combinations thereof. The media program 130 can be a television show, a paid subscription channel, or any other form of media broadcast.

A media controller 105 (referred to herein as a remote control 105) can be programmed to control the STB 120, the adjunct device 140, the media device 110, combinations thereof. In one embodiment, the remote control 105 can include a navigation element 107 such as a roller bar, joystick, navigation disk, touch-pad or other suitable navigation means that provides a user interface that can be visualized at the media device 110 or the remote control 105 if a display (e.g., LCD) is available. The remote control 105 can utilize common infrared or RF signaling technology to communicate with any of the aforementioned subsystems of the IPTV system 100.

In the embodiment shown, the adjunct device 140 integrates services supplied between the media device 110 and the STB 120, to extend programming and services not offered by the STB 120 alone. As one example, the adjunct device 140 receives telephony signals 150 and combines these signals with the multimedia signals 125 supplied by the STB 120. Accordingly, by combing these signals the adjunct device 140 can supplement services of telephony service providers and media programming service providers.

Figure 2:
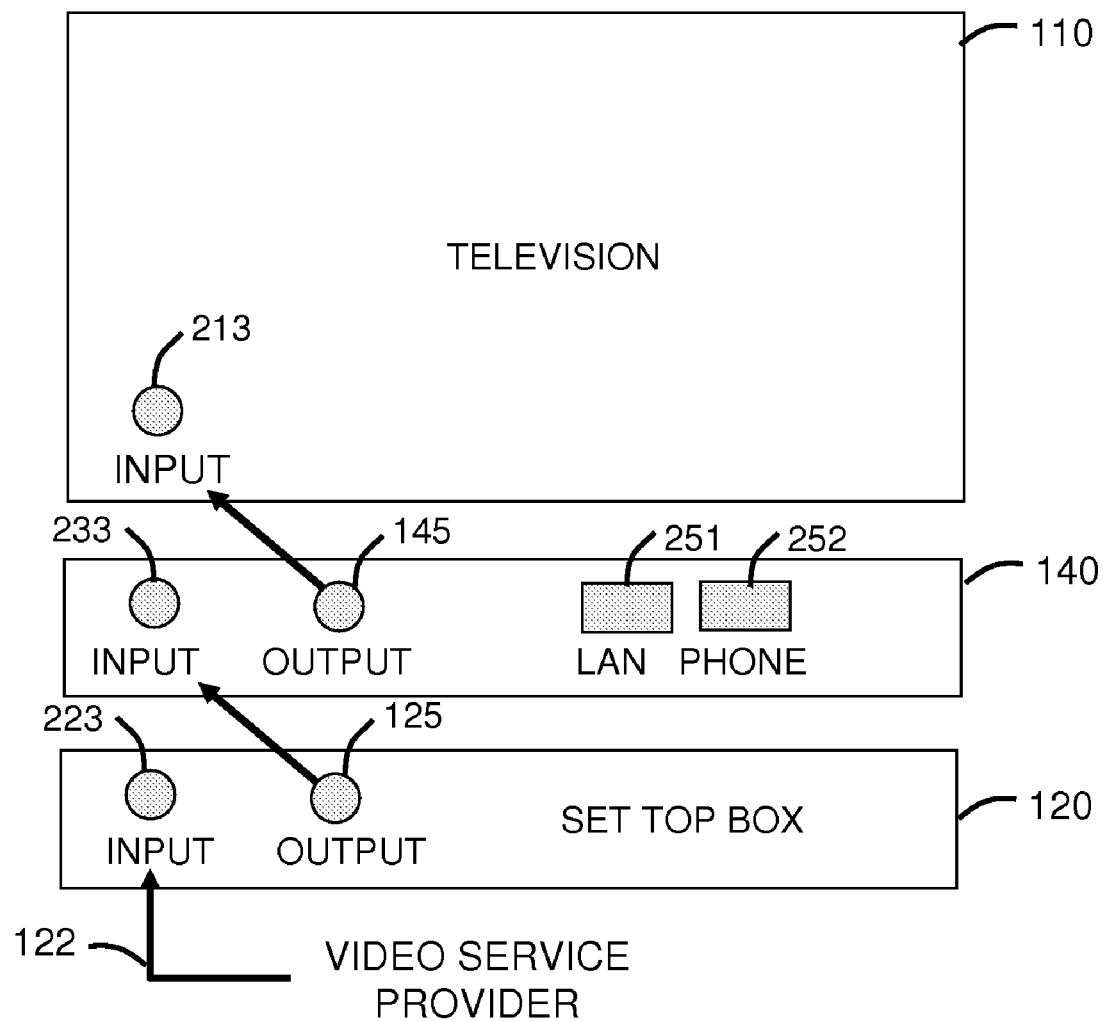
FIG. 2 depicts an exemplary connection diagram for the media system.

Referring to FIG. 2, a connection diagram of the IPTV system 100 of FIG. 1 is shown. As illustrated, the STB 120 can receive a cable, satellite or IPTV signal 122 as input 223. The output 125 of the STB 120 can be coupled to the input 233 of the adjunct device 140. Notably, the adjunct device 140 can receive additional inputs such as a LAN 251, and telephony 252 input. In such regard, the adjunct device 140 can complement the limited service offerings of the STB 110 by combining the multimedia signal 125 with additional IP and telephony services. The adjunct device 140 can send the combined signal as an output signal 145 to an input 213 of the media device 110. The adjunct device 140 can present a graphical user interface (GUI) at the media device 110 with selectable options to manage telephony and Internet services during television broadcasting.

The adjunct device 140 can utilize common video decoding, processing, and video combining techniques to perform the aforementioned operations. For example, the adjunct device 140 can include a first decoder for decoding the multimedia signal 125 of the STB 120, and a second decoder for decoding a telephony and/or IP signal. Utilizing common computing and storage technologies such as a microprocessor, digital signal processor, flash memory and/or hard disk drive, the adjunct device 140 can generate a GUI associated with the telephony signal when activity is detected, and replace the processed multimedia signal 125 or produce a combined signal that is then supplied to the media device 110 for presentation.

In one embodiment, the adjunct device 140 can modify the STB 120 out signal 125 to provide an alternate user interface and applications being displayed on a television 110. The adjunct device 140 can receive a video signal, decode the content being broadcasted, and supplement the video signal with Internet and programming guide information or preference information to generate customized content. As an example, the adjunct device 140 can incorporate monitoring of local broadcast information, such as weather information, with current video content, and present the local broadcast information based on current conditions. For instance, under emergency broadcast situations, the adjunct device 140 can present emergency local broadcasts over currently received video content from the STB 120 with or without interruption to the programming supplied therein.

In yet another example, the adjunct device 140 can insert Internet information into the video signal for presentation on the media device 110. For instance, the user may have an Internet account with tracking options enabled, for example an on-line auction. The adjunct device 140 can receive tracking information from the Internet, such as a current bid on an item, which can be overlaid in a portion of the media device 110 display. As another example, Internet Messages can be displayed on the media device during a program allowing for real time communications. As yet another example, the adjunct device 140 can allow a user to browse the internet on the media device 110 during a presentation of video content.

Figure 3:
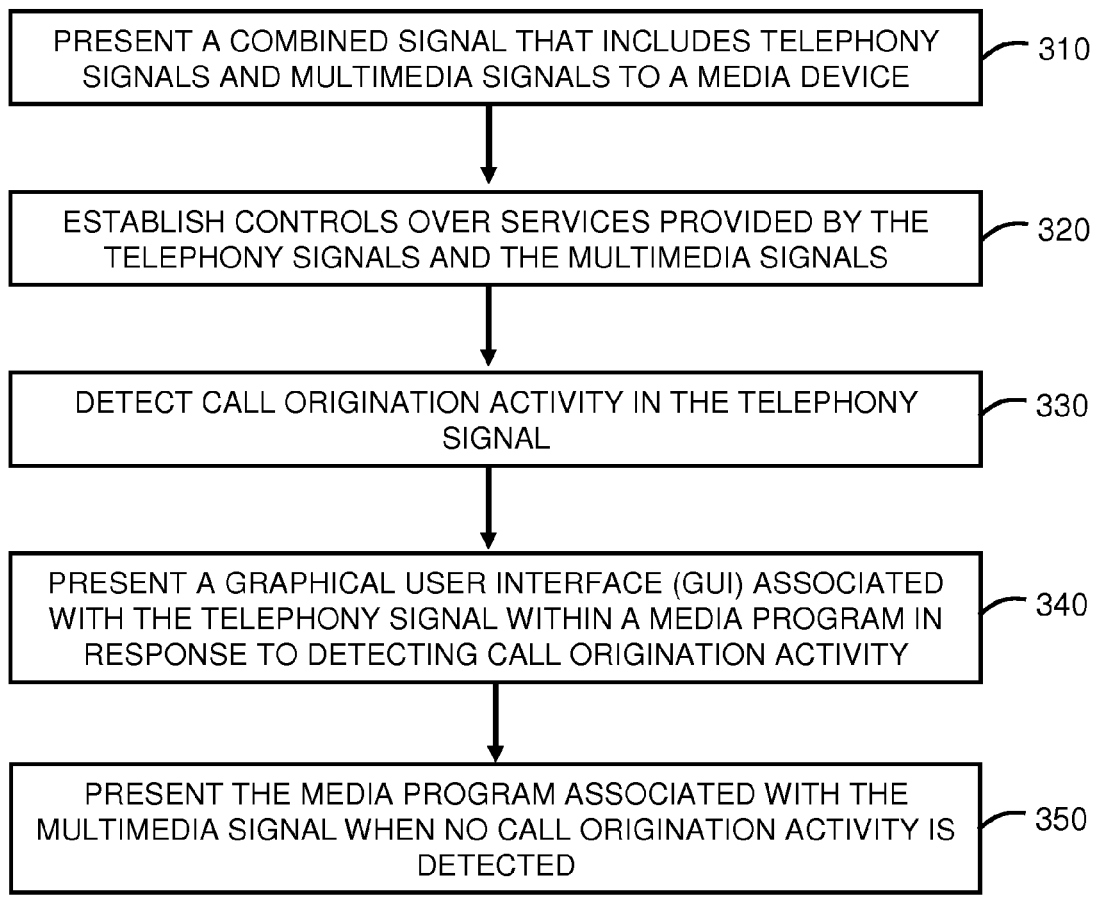
FIG. 3 depicts an exemplary method operating in portions of the media system.

Referring to FIG. 3, one exemplary method 300 operating in portions of the IPTV system 100 is shown. The method 300 can include more or less than the number of steps shown, and is not limited to the order of the steps shown in FIG. 3. Method 300 begins with step 310 by presenting a combined signal 145 to the media device 110 that includes telephony signals 150 and multimedia signals 125 supplied by the STB 120.

At step 320, controls over services provided by the telephony signals and the video signals can be established. For example, the adjunct device 140 can offer richer parental controls over services supplied by the telephony and video signals supplied by the STB 120. As another example, the adjunct device 140 can support video on demand (VoD) from third party sources not available to the STB 120 by way of its LAN connection 251. For instance, a customer can order a movie which can be streamed to the adjunct device 140 for presentation at specified date and time.

At step 330, the adjunct device 140 can be programmed to detect call origination activity in the telephony signal. Consider, during a presentation of a program 130 at the media device 110, a telephony call may be received. The adjunct device 140 can detect the call and provide an indication on the media device 110 that a call has been received. At step 340, a GUI associated with the telephony signal can be presented within the TV program 130 in response to detecting call origination activity. As one example, the GUI can be overlaid with the TV program when the adjunct device 140 detects call origination activity in the telephony signal. Alternatively, at step 350, the TV program 130 can be presented in place of the GUI when the adjunct device 140 detects no call origination activity in the telephony signal or the call origination activity has been terminated.

Briefly the adjunct device 140 can allow for various types of services including VoD, out-of-band advertising, Picture in Picture (PIP), Screen pops, and other services that may not be provided singly by a service provider of the STB 120 or the telephony service. For example, from the Internet port 251 the adjunct device 140 can retrieve local weather, local listings, local entertainment offerings that can be superimposed as a GUI in a remote portion of the program 130. In this illustration, the adjunct device 140 can integrate local services with regional or national broadcast services.

In another embodiment, the adjunct device 140 can provide local address book and telephony integrated services accessible through the media device 110 during presentation of a program 130. In yet another embodiment, the adjunct device 140 can provide an ability to rebroadcast a video stream to another local IP device when desired. For example, referring back to FIG. 2, upon the adjunct device 140 combining multimedia signals 125 from the STB 120 with the telephony signals 150, the adjunct device 140 can transmit the combined signal 145 to a mobile device or another computer by way of the LAN connection 251. In yet another arrangement, the adjunct device 140 can be customized to present telephony and Internet information in accordance with a user's preference. For example, a user may prefer to receive a PIP of a specific size for certain programs, commercials, or advertisements. As another example, a user may customize a PIP 585 for favorite channels or ordering of channels based on time.

Figure 4:
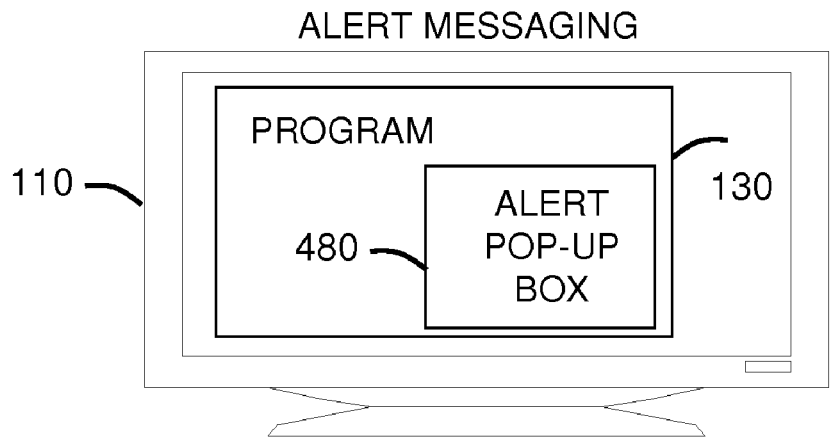
FIG. 4 illustrates an exemplary pop-up graphical user interface (GUI) generated by the adjunct device.

FIG. 4 illustrates an exemplary pop-up GUI combined by the adjunct device 140 with the multimedia signal 125 supplied by the STB 120. The adjunct device 140 can reformat the multimedia signal 125 when a pop-up alert 480 is presented at the media device 110. The remote control 105 can manage GUI elements such as soft GUI buttons of the pop-up alert 480. As an example, the pop-up alert may identify a movie release, a movie start time, a movie deal, a phone call, a media message, a video clip or any other notice.

Figure 5:
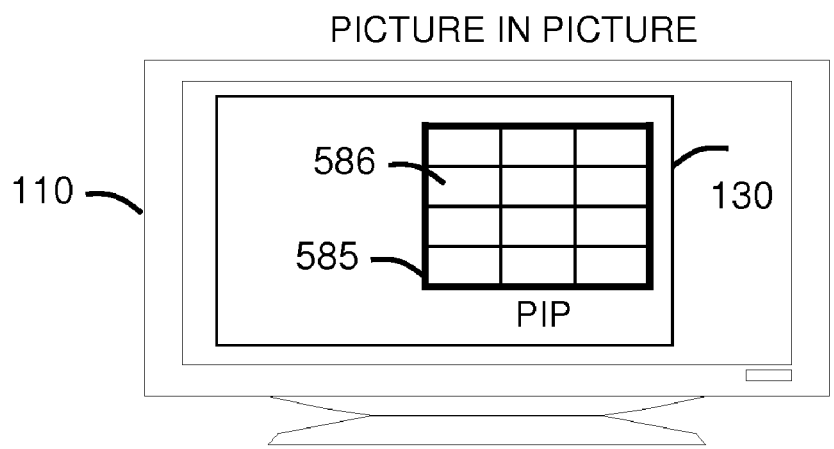
FIG. 5 illustrates an exemplary Picture-in-Picture option generated by the adjunct device.

FIG. 5 illustrates an exemplary Picture-in-Picture (PIP) 585 option supported by the adjunct device 140. The PIP 585 can include a plurality of broadcast channels 586 with live video presentation. This allows a user to quickly see multiple broadcast video programs playing at the same time. The user can then select a video program by traversing through the matrix of live stream videos with the remote control 105 utilizing the navigation element 107 (roller ball, joystick, navigation disk, etc.). The PIP 585 can also present Internet streaming videos, blogs, news broadcasts, personal video page feeds, within the channels 586. In one arrangement, the PIP 585 can be activated via a predefined key on the remote 105.

Figure 6:
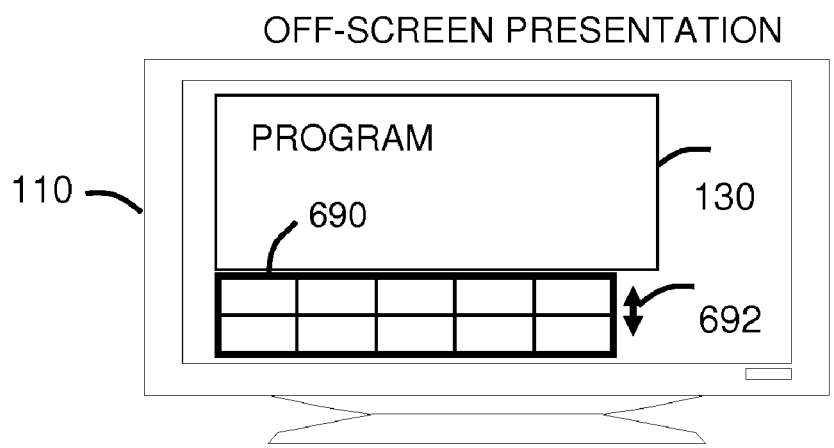
FIG. 6 illustrates a GUI concatenated with a media program with a scroll option generated by the adjunct device.

FIG. 6 illustrates a GUI concatenated with the media program 130 with a scroll option 692 generated by the adjunct device 140. The GUI bar 690 can be positioned in such as way that it does not block a view of the program 130 presented at the media device 110. The GUI bar 690 can include live internet video streams, subscription channels, paid programming channels, web pages, conference calls, phone call information, address book, or any other suitable visual or audio media program.

Figure 7:
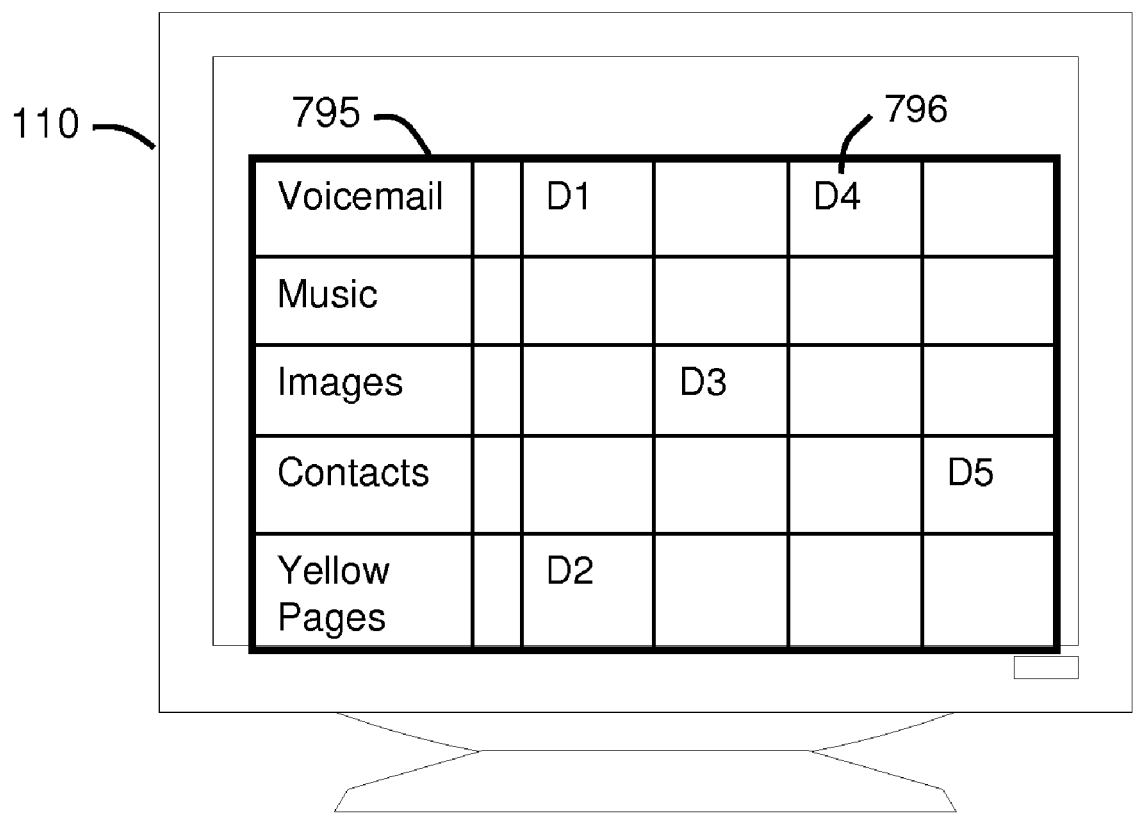
FIG. 7 illustrates an exemplary full screen GUI with selectable text or graphic information generated by the adjunct device.

FIG. 7 illustrates an exemplary full screen GUI 795 with selectable text or graphic information generated by the adjunct device 140. In the arrangement shown, the full screen GUI 795 can present a matrix of telephony or Internet services. Although the full screen GUI 795 does not show channel programming in the present illustration, the adjunct device 140 can be programmed to combine such program in this GUI. In the arrangement, since the media program 130 is not visible from a practical standpoint, the adjunct device 140 can be programmed to pause and record the media program 130 in a similar manner to a DVR device for later presentation.

Figure 8:
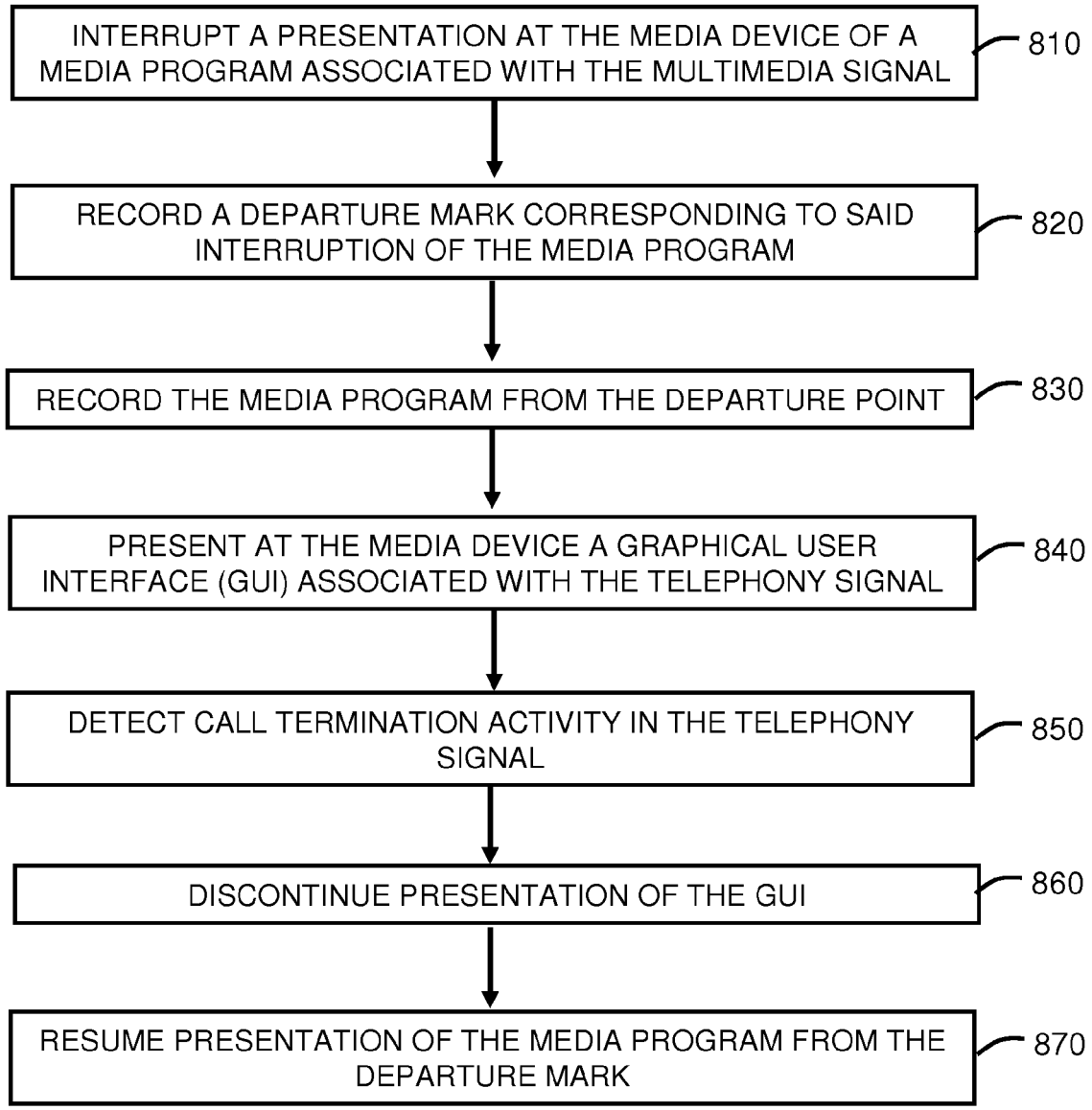
FIG. 8 depicts an exemplary method for processing calls by way of the media system.

FIG. 8 presents yet another exemplary presentation of a method 800 that can be applied to the IPTV system 100. Method steps 800 can be implemented by the adjunct device 140 to present telephony or Internet services with a recoverable interruption to multimedia services supplied by the STB 120. Beginning with step 810, the adjunct device 140 can be programmed to interrupt a presentation of a media program 130 associated with the multimedia signal 125. Responsive to the interruption, at step 820 the adjunct device 140 can record a departure mark associated with a time of the interruption in the media program 130, and commit the time to memory. At step 830, the adjunct device 140 can record the media program 130 from the departure point. At step 840, the adjunct device 140 can present at the media device 110 a GUI associated with the telephony signal. For example, when the call is received, a GUI such as a pop-up alert 480, can be presented to inform the user of the call, while the media program 130 is placed in a paused state.

At step 850, upon detecting call termination activity in the telephony signal, the adjunct device 140 can discontinue presentation of the GUI at step 860, and resume presentation of the media program from the departure mark at step 870. From the perspective of the user, the program 130 is temporarily paused during the call and resumed upon either the caller or called party terminating the call. In an alternative embodiment, the adjunct device 140 can inform the multimedia service provider to temporarily pause the multimedia feed until requested to restart again.

In another embodiment, the adjunct device 140 can be programmed to monitor an event associated with an Internet service (e.g., eBay™ auction, severe weather warnings, etc.) which can interrupt or overlay a GUI on an on-going media program presented at the media device 110. The GUI can present content to an end user such as bid status information (acceptance, rejection, bid period ended), type of warning, location of storm, etc. The type and context of Internet services that an end user can program the adjunct device 140 to monitor are innumerable and impractical to describe in totality by way of the present disclosure. Nevertheless, it would be evident to an artisan with ordinary skill that other Internet services not described herein can be applied to the methods described by the present disclosure. It should also be evident that media program interruptions resulting from the application of step 890 can be managed in a similar manner to steps 810-870.

From the foregoing descriptions, it would be evident to an artisan with ordinary skill in the art that the aforementioned embodiments can be modified, reduced, or enhanced without departing from the scope and spirit of the claims described below. For example, the adjunct device 140 can be programmed to relegate a DVR-like function during a telephony call to an accessory coupled to the STB 120 (e.g., a DVR) by way of the LAN 251 or other communication means (e.g., WiFi). From the embodiments of FIGS. 5-8 it should be evident to one of ordinary skill in the art that there are innumerable ways to present the media program 130 and GUIs associated with adjunct telephony and/or internet services. The adjunct device 140 and the STB 120 can be integrated into a single housing assembly thereby representing a single product (an "integrated STB"). In this embodiment, the STB 120 can have LAN and telephony input signals similar to FIG. 2 with a cable or media service connection supplied by a media service provider. The integrated STB can generate an output signal supplied to the media device 110 that performs the aforementioned disclosed embodiments. These are but a few examples of how the embodiments described herein can be updated without altering the scope of the claims below. Accordingly, the reader is directed to the claims for a fuller understanding of the breadth and scope of the present disclosure.

Figure 9:
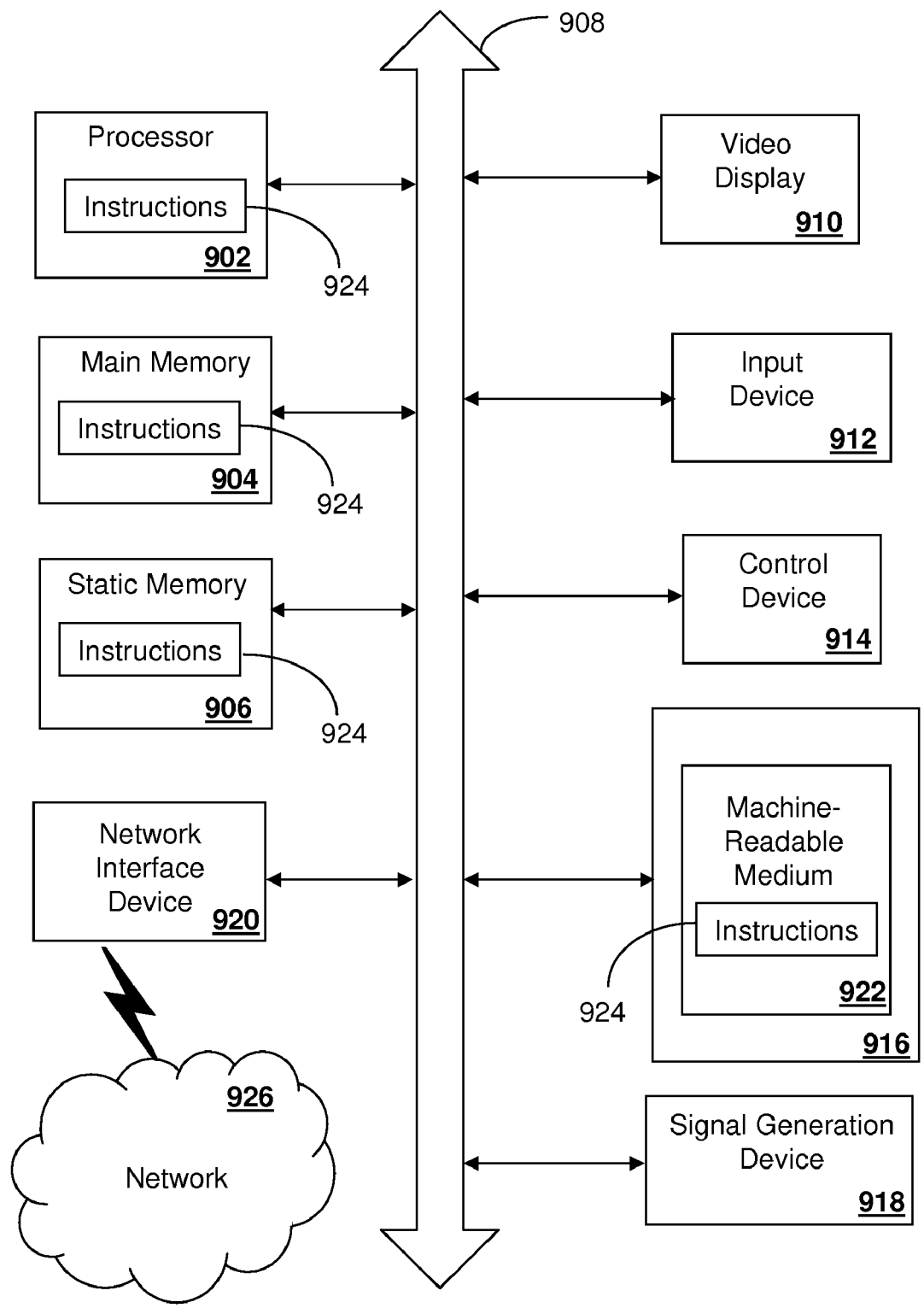
FIG. 9 depicts an exemplary diagrammatic representation of a machine in the form of a computer system within which a set of instructions, when executed, may cause the machine to perform any one or more of the methodologies disclosed herein.

FIG. 9 depicts an exemplary diagrammatic representation of a machine in the form of a computer system 900 within which a set of instructions, when executed, may cause the machine to perform any one or more of the methodologies discussed above. In some embodiments, the machine operates as a standalone device such as the adjunct device 140. In some embodiments, the machine may be connected (e.g., using a network) to other machines, or integrated within other machines, such as the media device 110. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 900 may include a processor 902 (e.g., a central processing unit (CPU), a graphics processing unit (GPU, or both), a main memory 904 and a static memory 906, which communicate with each other via a bus 908. The computer system 900 may further include a video display unit 910 (e.g., a liquid crystal display (LCD), a flat panel, a solid state display, or a cathode ray tube (CRT)). The computer system 900 may include an input device 912 (e.g., a keyboard), a cursor control device 914 (e.g., a mouse), a mass storage medium 916, a signal generation device 918 (e.g., a speaker or remote control) and a network interface device 920.

The mass storage medium 916 may include a computer-readable storage medium 922 on which is stored one or more sets of instructions (e.g., software 924) embodying any one or more of the methodologies or functions described herein, including those methods illustrated above. The computer-readable storage medium 922 can be an electromechanical medium such as a common disk drive, or a mass storage medium with no moving parts such as Flash or like non-volatile memories. The instructions 924 may also reside, completely or at least partially, within the main memory 904, the static memory 906, and/or within the processor 902 during execution thereof by the computer system 900. The main memory 904 and the processor 902 also may constitute computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 924, or that which receives and executes instructions 924 from a propagated signal so that a device connected to a network environment 926 can send or receive voice, video or data, and to communicate over the network 926 using the instructions 924. The instructions 924 may further be transmitted or received over a network 926 via the network interface device 920.

While the computer-readable storage medium 922 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present disclosure.

The term "computer-readable storage medium" shall accordingly be taken to include, but not be limited to: solid-state memories such as a memory card or other package that houses one or more read-only (non-volatile) memories, random access memories, or other re-writable (volatile) memories; and magneto-optical or optical medium such as a disk or tape. Accordingly, the disclosure is considered to include any one or more of a computer-readable storage medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An adjunct device coupled between a Set-Top Box (STB) and a media device, comprising:
   a first port for connecting the adjunct device to the STB via a first hardwire connection;
   a second port for connecting the adjunct device to the media device via a second hardwire connection;
   a third port for connecting the adjunct device to the media device via a third hardwire connection;
   a controller element that:
   receives a telephony signal from a communication system and an Internet Protocol Television (IPTV) multimedia signal supplied by the STB;
   monitors call origination activities in the telephony signal; and
   presents at the media device in whole or in part the telephony and the IPTV multimedia signal according to the call origination activities monitored,
   wherein the adjunct device comprises a separate unit which is operative to integrate services supplied between the media device and the STB.

2. The adjunct device of claim 1, further comprising a fourth port for connecting the adjunct device to the Internet, wherein the media device comprises at least one among a television unit, and an audio unit.

3. The adjunct device of claim 1, wherein the telephony signal comprises one among a packet-switched signal and a circuit-switched signal, each transporting at least one among image and audio data.

4. The adjunct device of claim 1, wherein the IPTV multimedia signal comprises at least one among image and audio data.

5. The adjunct device of claim 1, wherein the controller element exclusively presents at the media device the IPTV multimedia signal in response to detecting no call origination activity in the telephony signal.

6. The adjunct device of claim 1, wherein the controller element:
   detects call origination activity in the telephony signal;
   generates a multiplexed signal comprising at least a portion of the telephony signal and the IPTV multimedia signal; and
   presents the multiplexed signal at the media device.

7. The adjunct device of claim 6, wherein the multiplexed signal comprises an overlay of images corresponding to a graphical user interface (GUI) associated with the telephony signal and a media program associated with the IPTV multimedia signal.

8. The adjunct device of claim 7, wherein the controller element receives signals from a media controller that manages at least one among the call origination activity by way of the GUI and the media program.

9. The adjunct device of claim 1, wherein the controller element performs at least one among interrupting and overlaying a monitored event on the media program.

10. The adjunct device of claim 1, wherein the controller element:
    interrupts presentation at the media device of a media program associated with the IPTV multimedia signal;
    records a departure mark corresponding to said interruption of the media program;
    records the media program from the departure point; and
    presents at the media device a graphical user interface (GUI) associated with the telephony signal.

11. The adjunct device of claim 10, wherein the controller element receives signals from a media controller and manages the call origination activity by way of the GUI.

12. The adjunct device of claim 10, wherein the controller element presents a paused state of the media program from the departure mark and the GUI overlaid on said paused media program.

13. The adjunct device of claim 10, wherein the controller element exclusively presents the GUI.

14. The adjunct device of claim 10, wherein the controller element:
    detects call termination activity in the telephony signal;
    discontinues presentation of the GUI; and
    resumes presentation of the media program from the departure mark.

15. The adjunct device of claim 1, comprising a combination element that processes and combines portions of the telephony and IPTV multimedia signals for presentation at the media device.

16. The adjunct device of claim 1, wherein the IPTV multimedia signal comprises broadcast and interactive media services.

17. A computer-readable storage medium, comprising a program for instructing an adjunct device to:
    receive telephony signals from a telephony network;
    receive multimedia signals from a set-top box (STB);
    present at a media device in whole or in part the telephony signals and the multimedia signals supplied by an Internet Protocol Television (IPTV) subsystem,
    wherein the adjunct device comprises a separate unit that is not integrated with the STB and which is operative to integrate services supplied between the media device and the (STB).

18. The storage medium of claim 17, comprising computer instructions for exclusively presenting at the media device the multimedia signal in response to detecting no call origination activity in the telephony signal.

19. The storage medium of claim 17, comprising computer instructions for:
    detecting call origination activity in the telephony signal; and
    responsive to the detected call origination activity, presenting at the media device an overlay of images corresponding to a graphical user interface (GUI) associated with the telephony signal and a media program associated with the multimedia signal.

20. The storage medium of claim 17, comprising computer instructions for:
  interrupting a presentation at the media device of a media program associated with the multimedia signal;
  recording a departure mark corresponding to said interruption of the media program;
  recording the media program from the departure point; and
  presenting at the media device a graphical user interface (GUI) associated with the telephony signal.

21. The storage medium of claim 20, comprising computer instructions for:
  detecting call termination activity in the telephony signal;
  discontinuing presentation of the GUI; and
  resuming presentation of the media program from the departure mark.

22. A method, comprising:
  receiving at an adjunct device a video signal from a set-top box that is remote from the adjunct device;
  receiving at the adjunct device a telephony signal from a communication system;
  presenting at a TV set by way of the adjunct device that is remote from the adjunct device a combined signal comprising in whole or in part the telephony signal and the video signal,
  wherein the adjunct device comprises a separate unit which is operative to integrate services supplied between the TV set and the STB.

23. The method of claim 22, comprising presenting at the TV set at least one among a graphical user interface (GUI) associated with the telephony signal in place of a TV program supplied by the video signal when the adjunct device detects call origination activity in the telephony signal, the TV program in place of the GUI when the adjunct device detects no call origination activity in the telephony signal, an overlay of the GUI and the TV program when the adjunct device detects call origination activity in the telephony signal.

24. The method of claim 23, comprising receiving signals at the adjunct device to establish parental controls over services supplied by the telephony and video signals.

* * * * *